United States Patent [19]
Bhakuni et al.

[11] 3,793,132
[45] Feb. 19, 1974

[54] MODIFIED POLYESTER AND RUBBER STRUCTURES MADE THEREFROM

[75] Inventors: Roop S. Bhakuni, Copley; Joseph L. Cormany, Jr., Akron, both of Ohio

[73] Assignee: The Goodyear Tire & Rubber Company, Akron, Ohio

[22] Filed: Feb. 23, 1972

[21] Appl. No.: 228,761

[52] U.S. Cl.......... 161/144, 156/110 A, 156/110 C, 161/231, 260/45.7 P, 260/45.7 R, 260/45.95, 260/75 T, 260/860
[51] Int. Cl........................... B29h 9/04, C08g 39/10
[58] Field of Search. 260/860, 75 T, 45.7 P, 45.7 R, 260/45.95; 156/110 A, 110 C; 161/231, 144

[56] References Cited
UNITED STATES PATENTS

| | | | |
|---|---|---|---|
| 3,262,911 | 7/1966 | Hay | 260/47 |
| 3,386,952 | 6/1968 | Gleim | 260/45.95 |
| 3,661,623 | 5/1972 | Bhakuni et al | 117/76 |
| 3,051,212 | 8/1962 | Daniels | 260/75 |
| 3,563,847 | 2/1971 | Rye et al | 161/176 |
| 3,658,637 | 4/1972 | Danielson | 161/231 |

Primary Examiner—William H. Short
Assistant Examiner—Edward Woodberry
Attorney, Agent, or Firm—F. W. Brunner

[57] ABSTRACT

Relates to an improved rubber structure reinforced with an improved polyethylene terephthalate reinforcing fiber modified with anthraquinone, a hindered phenol, calcium aluminum silicate, or a polyphenylene ether, the modifier being present with the polyester prior to fiber formation.

2 Claims, No Drawings

MODIFIED POLYESTER AND RUBBER STRUCTURES MADE THEREFROM

This invention relates to an improved rubber structure reinforced with an improved polyester reinforcing fiber modified with anthraquinone, a hindered phenol, calcium aluminum silicate or a polyphenylene ether.

Pneumatic tires are being subjected to increasingly severe operating conditions including high speeds and heavy loads. Rubber used in the tire is reinforced with such materials as rayon, nylon, polyester, wire, and glass fibers. Maximum reinforcement of the rubber is obtained with a given fiber when maximum adhesion is produced between the rubber and fiber. Polyethylene terephthalate tire cords are particularly desirable to use as reinforcing elements because of their excellent dimensional stability as shown by low growth or stretch during service. However, it has been observed that in the environment of the rubber of a pneumatic tire the heat generated under high speeds and heavy loads causes the polyester cord to lose its durability, its tensile strength and ultimately its adhesion to the rubber.

The chemical environment of the rubber of a tire is complex because many different chemicals are needed in the construction of the tire in order to obtain maximum tire performance. Because of this chemical complexity in the rubber of the tire and the severe heat developed during service, a variety of chemical reactions may take place resulting in by-products that adversely affect the polyester cord.

Many attempts have been made to minimize these adverse effects on the polyester cord such as modifying the rubber, or modifying the adhesive. The present invention is directed to modifying the polyester cord.

It has now been discovered that a more thermally stable pneumatic tire may be made when the rubber thereof is reinforced with a polyester cord modified in the manner described herein.

The thermally stable tire is made possible by the discovery that a polyester cord used in the construction of the pneumatic tire can be protected against tensile loss in the cord and degradation of the adhesive bond between the cord and the rubber by incorporating in the polyester prior to fiber formation a critically small amount of any of the following modifiers:

1. anthraquinone
2. a hindered phenolic phosphorous compound
3. calcium aluminum silicate
4. a polyphenylene ether It is believed that certain desirable reactions take place between certain undesirable by-products present in the polyester and the added modifiers to form a reaction product which is less detrimental to the polyester at elevated temperatures than are the by-products. Although the amounts of modifiers as recited subsequently herein can be used in the practice of the present invention, any of the modifiers described herein can be used in the range of from about 0.01 part to about 2.0 parts by weight of the modifier per 100 parts by weight of the polyester.

Anthraquinone has the following structural formula:

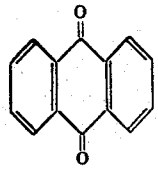

The anthraquinone may be used in an amount from about 0.01 part to about 2.0 parts by weight per 100 parts of polyester.

The hindered phenolic phosphorus compounds have the formula:

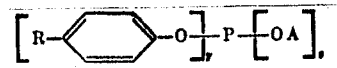

in which R is a hydrocarbon radical containing from 4 to 10 carbon atoms, P represents the phosphorous atom, and $y$ and $z$ are integers selected from 1 and 2 and the sum of $y$ plus $z$ equals 3 and A is selected from the group consisting of

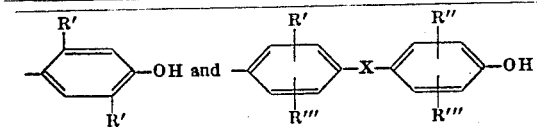

wherein R' and R'' are selected from the group consisting of the same and different tertiary alkyl radicals containing from 4 to 8 carbon atoms, R''' is selected from hydrogen and alkyl radicals containing from 2 to 10 carbon atoms and X is a saturated aliphatic divalent radical containing from 1 to 4 carbon atoms.

These modifiers are added to the polyester in amounts from 0.025 to 5 parts and preferably from 0.1 to 2.5 parts per 100 parts of polyester. A particularly effective modifier is one having the formula

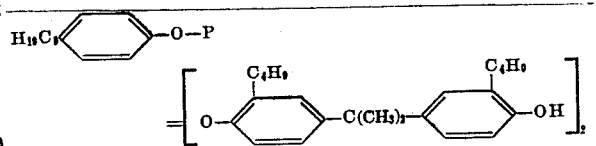

and for convenience referred to as HPP.

Calcium aluminum silicate is also useful to improve the thermal stability of the cord, especially when used as a reinforcing cord in a pneumatic tire. This silicate may be added to the polyester chips in amounts from about 0.1 to 5 parts per 100 parts of polyester.

The polyphenylene ether has the general formula

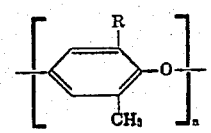

where R and n have values as disclosed in U. S. Pat. No. 3,262,911, examples for R being a lower strait chain alkyl radical such as methyl, ethyl and propyl, halogen such as chlorine and bromine, and examples for $n$ being at least 10 and as high as 1,000 to 2,000. A specific polyphenylene ether that may be used has the general formula

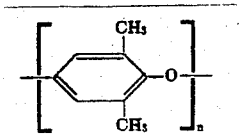

where $n$ has a value such that the melt viscosity of the polymer when measured at 550° F. at a shear rate of 1,500 reciprocal seconds (sec$^{-1}$) is 2,200 poise and hereinafter referred to as Noryl.

The polyester being modified is any fiber forming thermoplastic linear high molecular weight condensation polyester, and particularly polyethylene terephthalate as well as polymers of cyclohexanedimethylene terephthalate. These polyesters as well as copolyesters of aromatic dicarboxylic acids and particularly condensation products of ethylene glycol with a mixture of terephthalic acid and another dibasic acid such as sebasic or adipic acid or hydroxycarboxylic acid such as parahydroxy benzoic acid present in small amounts and polyesters of terephthalic acid with the glycol 1,4-bis(hydroxymethyl) cyclohexane. By linear terephthalic polyesters is meant a linear condensation polyester comprising recurring glycol dicarboxylate structural units in which at least about 85 percent of the recurring structural units are units of the formula

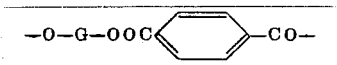

wherein G represents a divalent organic radical containing from about 2 to about 8 carbon atoms which is attached to the adjacent oxygen atoms by saturated carbon atoms. The terephthalate radical may be the sole dicarboxylate constituent of the recurring structural units or up to about 15 percent of the structural units may contain other dicarboxylate radicals such as adipate, sebacate, isophthalate, 4,4' bibenzoate and hexahydroterephthalate. By high molecular weight is meant polyesters having an intrinsic viscosity of at least 0.6 and preferably greater than 0.8 and as high as 1.5 as measured in a 60/40 phenol/tetrachlorethane mixed solvent at 30° C. It is preferred that the polyethylene terephthalate and other similar polyesters have a high melting point which for polyethylene terephthalate is about 265° C. measured with a hot state polarizing microscope. Generally the polyester fibers of this invention may be prepared in accordance with well known procedures for melt extrusion and drafting.

The following examples disclose how an improved polyester cord may be made by adding the modifiers of this invention to polyester chips and then forming filaments therefrom, which modified polyester filaments are then gathered into yarn which is then twisted to form a cord.

TABLE I

| Ingredients | Examples (parts by weight) | | | | |
|---|---|---|---|---|---|
| | 1 (control) | 2 | 3 | 4 | 5 |
| 1. Polyethylene terephthalate (polyester chips) | 100 | 100 | 100 | 100 | 100 |
| 2. Anthraquinone | — | 0.1 | — | — | — |
| 3. HPP | — | — | 0.5 | — | — |
| 4. Calcium aluminum silicate | — | — | — | 0.2 | — |
| 5. Polyphenylene ether (Noryl) | — | — | — | — | 0.5 |

The dried polyester chips (1) are tumbled with the modifiers (2), (3), (4) and (5) as indicated for Examples 2, 3, 4 and 5 until the mixture is substantially homogeneous. Each blend is then melted in a conventional extruder head and each melt is then spun at a temperature of about 290° C. through a 190 hole spinneret at a spinning speed of 150 yards per minute to give a single spun yarn having a total denier of approximately 7,800 in accordance with well-known practice used in the melt spinning art and shown in U. S. Pat. Nos. 3,091,510 and 3,097,056. The spun yarn is passed to a pair of rotating heated feed rolls and then passed around a pair of heated draw rolls rotating at a speed to impart a draw ratio of about 6 to 1 to give a total denier of approximately 1,300 and then would on a bobbin.

The modified polyester yarn had the following properties.

Table II

| Properties | Examples | | | | |
|---|---|---|---|---|---|
| | 1(Control) | 2 | 3 | 4 | 5 |
| 1. Tenacity (grams/denier) | 8.0 | 8.0 | 7.0 | 7.8 | 7.6 |
| 2. Break elongation (%) | 9.5 | 9.6 | 13.4 | 10.9 | 9.8 |
| 3. I.V. | 0.79 | 0.78 | 0.77 | 0.76 | 0.78 |

The yarn of Examples 1, 2, 3, 4 and 5 was made into cords (1300/3, 8/8) and treated with conventional R/F/L adhesive made in the following manner, R/F/L being resorcinol/formaldehyde/rubber latex adhesive. A 20 percent solids dispersion of the R/F/L adhesive is made by adding 8.9 parts of resorcinol to 6.55 parts of a 37 percent solution of formaldehyde and 5 parts of a 10 percent solution of sodium hydroxide which is then added to a rubber latex mixture comprising 35.5 parts of a 39.5 percent total solids of the 70/15/15 terpolymer of butadiene/styrene/vinyl pyridine and 64 parts of a 40.7 percent total solids of a 70/30 copolymer of butadiene/styrene, the mixture being in 130.05 parts of water. The cords are passed through a dip tank containing this adhesive. The dipped cords are then dried at 450° F. and embedded in rubber compounded as shown below. Peel adhesion test is made of a 1-inch strip under static conditions at 290° F. Thermal stability of the cord is measured in terms of percent tensile retained by the air bomb (AB). Air bomb testing is done by heating the untreated cord embedded in the rubber compound as shown below for 2.5 hours at 350° F. under 80 psi air pressure. The data obtained is listed in Table III.

Table III

| Rubber reinforced with Cord from Example | Peel Adhesion[1] Force Rating | Mallory Strip Fatigue KC[2] | Percent Tensile Retained |
|---|---|---|---|
| 1. Control (no modifier added) | 100 | 100 | 100 AB |
| 2. Anthraquinone | 106 | 149 | 116 AB |
| 3. HPP | 125 | 220 | 109 AB |
| 4. Calcium aluminum silicate | 127 | 153 | 100 AB |
| 5. Polyphenylene ether (Noryl) | 122 | 188 | 107 AB |

[1] Peel adhesion is determined in the following manner. Onto the surface of a 12 mil thick sheet (12"×12") of rubber (MRS) is laid the treated cords at the rate of 18 per inch which are then covered with a second sheet (12"×12") of 12 mil gauge rubber (MRS). This "sandwich" arrangement of rubber cord and rubber cord then doubled onto itself with a piece of Holland cloth extending one inch into the doubled assembly from the open end from which assembly is clicked 1" × 3" samples, which samples are then cured in a mold at 290° F. for 20 minutes. The cured sample is then placed in an Instron machine, heated at 250° F. and the two strips of rubber separated by the Holland cloth are then moved in opposite directions at the rate of 2 inches per minute to determine the average force.
² ASTM-D 885-59T.

The rubber component of the rubber structure of this invention may be any rubber that is a stretchable composition having a tendency to return to its approximate original shape after being vulcanized, and particularly any rubber that is used in the manufacture of tires and drive belts. Thus, the laminate of this invention may involve natural rubber otherwise known as Hevea Brasiliensis, or conjugated diene polymeric rubbers made by polymerizing butadiene-1,3, isoprene, 2,3-dimethyl butadiene-1,3, and mixtures of these conjugated dienes as well as copolymers of these diene monomers with up to 50 percent of compounds which contain a $CH_2=C=$ group and which are copolymerizable with butadiene-1,3 where, for example, at least one of the valences is attached to an electronegative radical, that is a radical which increases the polar character of the molecule such as vinyl, phenyl, nitrile and carboxy radicals. Examples of the diene rubbers are polybutadienes including the stereospecifics, polyisoprenes including the stereospecifics, butadiene/styrene copolymers, also known as SBR, and butadiene/acrylonitrile copolymers also known as NBR.

The control and modified polyester cords of this invention are embedded in rubber compounded in accordance with the following formula:

TABLE IV

| Ingredients | Parts by Weight | |
| --- | --- | --- |
| | Amount Used | May be Used |
| 1. Natural Rubber | 70 | 0–100 |
| 2. OE/SBR 1778 (styrene/butadiene-1,3 23.5/76.5 copolymer) (plus 37½ parts oil per 100 SBR) | 27.5 | 100–0 |
| 3. Cis 1,4-polybutadiene | 10 | 0–50 |
| 4. Carbon Black (Reinforcing agent) | 40 | 25–100 |
| 5. Zinc Oxide (Activator of cure) | 4 | 2–10 |
| 6. Stearic Acid (Activator of cure) | 2 | 1.5–3.0 |
| 7. Primary Accelerator (2,2'-dithiobisbenzothiazole) | 1.25 | 0.5–3.0 |
| 8. Pine Oil (Softener) | 10 | 2–50 |
| 9. Secondary Accelerator (Tetramethylthiuram disulfide) | 0.10 | 0.05–1.0 |
| 10. Antioxidant | 0.60 | 0.1–4 |
| 11. Sulfur (Vulcanizing agent) | 2.5 | 1.0–5.0 |

In compounding the rubber stock in accordance with the formulation set forth above, a master batch of ingredients 1 and 2 are made with the carbon black and mixed on a mill to a temperature of about 110° C. and may be mixed at a temperature as high as 140° C. The resulting carbon black master batch is then cooled and the remaining compounds are mixed into the batch in the order indicated above to a temperature of about 70° C. and may be mixed at a temperature as high as 100° C.

The rubber structure of this invention may be prepared by first coating a reinforcing fabric with the rubber and then using the rubber coated fabric to make any desired structure as, for example, a pneumatic tire. The rubber will be compounded in the manner set forth above. The reinforcing fabric may be used without any previous treatment, and under these conditions the fabric is known as grey cord indicating that no treatment in the form of an adhesive composition has been applied to the surface of the cord. Thus, the present invention may be used in the manufacture of a pneumatic tire of conventional present day design as shown, for example, in such U. S. Pat. Nos. as 3,157,218; 3,160,191; 3,160,192; 3,217,778; 3,225,810; 3,225,812; 3,244,215; 3,253,633; and 3,253,638 all of which show a vulcanized rubberized fabric carcass of generally torodial shape having a tread portion superimposed and bonded to the crown area of the carcass and plies of rubberized fabric forming sidewalls extending from the tread over the carcass to the bead portion.

While certain representative embodiments and details have been shown for the purpose of illustrating the invention, it will be apparent to those skilled in this art that various changes and modifications may be made therein without departing from the spirit or scope of the invention.

What is claimed is:

1. A heat stable structure comprising vulcanized rubber and a heat stable polyester tire cord, the cord being bonded to the rubber, the cord being made of polyethylene terephthalate fibers melt spun from a mixture comprising polyethylene terephthalate having an I.V. of at least 0.6 measured in a 60/40 phenol/tetrachlorethane mixed solvent at 30° C., and a modifier selected from the group consisting of anthraquinone, calcium aluminum silicate, a hindered phenol having the general formula

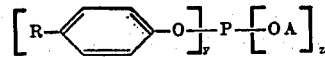

wherein R is a hydrocarbon radical (4 to 10C), P is phosphorus, and y and z are integers 1 or 2 and the sum of y and z equals 3 and A is selected from the group consisting of

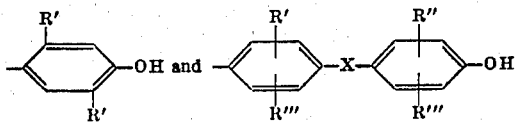

wherein R' and R'' are the same or different tertiary alkyl radicals (4 to 8C), R''' is hydrogen or alkyl radicals (2 to 10C) and X is a saturated aliphatic divalent radical (1 to 4C) and a polyphenylene ether having the general formula

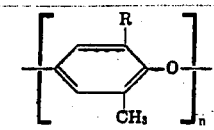

wherein R is selected from the group consisting of a lower strait chain alkyl radical and a halogen, and n has a value such that the metal viscosity of the polymer is about 2,200 poise when measured at 550° F. at a shear rate of 1,500 sec$^{-1}$, wherein the parts by weight of the modifier per 100 parts by weight of polyester are from about 0.01 part to about 2.0 parts where the modifier is the anthraquinone, 0.025 to 5 parts where the modifier is the hindered phenolic phosphorous compound, from 0.1 to 5 parts where the modifier is calcium aluminum silicate and from 0.1 part to 2.0 parts where the modifier is the polyphenylene ether.

2. A polyester fiber melt spun from a mixture comprising polyethylene terephthalate having an I.V. of at least 0.6, measured in a 60/40 phenol/tetrachlorethane mixed solvent at 30° C. and from about 0.01 part to about 2.0 parts by weight per 100 parts by weight of polyethylene terephthalate of a modifier selected from the group consisting of anthraquinone, calcium aluminum silicate, a hindered phenol having the general formula

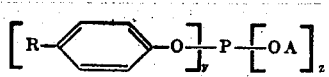

wherein R is a hydrocarbon radical (4 to 10C), P is phosphorous, and y and z are integers 1 or 2 and the sum of y and z equals 3 and A is selected from the group consisting of

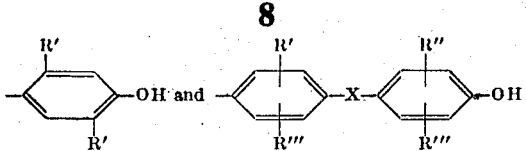

wherein R' and R'' are the same or different tertiary alkyl radicals (4 to 8C), R''' is hydrogen or alkyl radicals (2 to 10C) and X is a saturated aliphatic divalent radical (1 to 4C) and a polyphenylene ether having the general formula

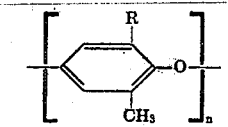

wherein R is selected from the group consisting of a lower straight chain alkyl radical and a halogen, and n has a value such that the melt viscosity of the polymer is about 2,200 poise when measured at 550° F. at a shear rate of 1,500 sec$^{-1}$.

* * * * *

PO-1050
(5/69)

UNITED STATES PATENT OFFICE
CERTIFICATE OF CORRECTION

Patent No. 3,793,132      Dated February 19, 1974

Inventor(s) Roop S. Bhakuni and Joseph L. Cormany, Jr.

It is certified that error appears in the above-identified patent and that said Letters Patent are hereby corrected as shown below:

Column 5, line 2, "rubber cord and rubber cord then" should read -- rubber cord and rubber is then --.

Column 7, line 3, "metal viscosity" should read -- melt viscosity --.

Column 7, line 11, "0.1 part to 2.0 parts" should read -- 0.01 part to 2.0 parts --.

Signed and sealed this 3rd day of September 1974.

(SEAL)
Attest:

McCOY M. GIBSON, JR.
Attesting Officer

C. MARSHALL DANN
Commissioner of Patents